(12) United States Patent
Barclay et al.

(10) Patent No.: US 8,040,875 B2
(45) Date of Patent: Oct. 18, 2011

(54) NETWORK SUPPORT FOR CALLER ID VERIFICATION

(75) Inventors: Deborah Lewandowski Barclay, Winfield, IL (US); David S Benco, Winfield, IL (US); Sanjeev Mahajan, Naperville, IL (US); Thomas Lee McRoberts, Naperville, IL (US); Raymond Leroy Ruggerio, Glenview, IL (US)

(73) Assignee: Alcatel Lucent, Paris (FR)

( * ) Notice: Subject to any disclaimer, the term of this patent is extended or adjusted under 35 U.S.C. 154(b) by 1757 days.

(21) Appl. No.: 11/192,676

(22) Filed: Jul. 30, 2005

(65) Prior Publication Data

US 2007/0036136 A1    Feb. 15, 2007

(51) Int. Cl.
*H04L 12/66* (2006.01)
(52) U.S. Cl. ......... 370/352; 370/351; 370/353; 370/354
(58) Field of Classification Search ............... 379/93.24, 379/114.14, 93.23, 245–247, 142.01–142.06; 709/200, 230; 370/351–356
See application file for complete search history.

(56) References Cited

U.S. PATENT DOCUMENTS

| | | | | |
|---|---|---|---|---|
| 5,185,860 A * | 2/1993 | Wu | ............................... | 709/224 |
| 5,583,862 A * | 12/1996 | Callon | ......................... | 370/397 |
| 6,122,665 A * | 9/2000 | Bar et al. | ...................... | 709/224 |
| 6,272,127 B1 * | 8/2001 | Golden et al. | ................. | 370/352 |
| 6,292,478 B1 * | 9/2001 | Farris | ........................... | 370/352 |
| 6,445,781 B1 * | 9/2002 | Heinmiller et al. | ...... | 379/142.01 |
| 6,452,924 B1 * | 9/2002 | Golden et al. | ................. | 370/352 |
| 6,587,867 B1 * | 7/2003 | Miller et al. | .................. | 709/200 |
| 6,748,439 B1 * | 6/2004 | Monachello et al. | ......... | 709/229 |
| 6,779,031 B1 * | 8/2004 | Picher-Dempsey | .......... | 709/224 |
| 6,963,635 B1 * | 11/2005 | Jones | ........................ | 379/114.14 |
| 6,976,081 B2 * | 12/2005 | Worger et al. | ................ | 709/230 |
| 7,254,643 B1 * | 8/2007 | Peters et al. | .................. | 709/246 |
| 7,280,528 B1 * | 10/2007 | Polit et al. | ...................... | 370/352 |
| 7,290,061 B2 * | 10/2007 | Lentini et al. | .................. | 709/246 |
| 7,340,507 B2 * | 3/2008 | Tuunanen et al. | ............ | 709/219 |
| 7,366,183 B1 * | 4/2008 | Sylvain | .................... | 370/395.61 |
| 7,379,423 B1 * | 5/2008 | Caves et al. | ................... | 370/232 |
| 7,453,990 B2 * | 11/2008 | Welenson et al. | ............... | 379/45 |
| 7,519,986 B2 * | 4/2009 | Singhal | ............................. | 726/2 |
| 7,535,905 B2 * | 5/2009 | Narayanan et al. | ........... | 370/392 |
| 2001/0028711 A1 * | 10/2001 | Antonucci et al. | ............ | 379/245 |

(Continued)

FOREIGN PATENT DOCUMENTS

EP         1263197 A2 *   12/2002

*Primary Examiner* — Ahmad F Matar
*Assistant Examiner* — Vedesh Rampersad
(74) *Attorney, Agent, or Firm* — S. R. Santema

(57) ABSTRACT

Caller ID information provided coincident to a Voice over IP (VoIP) call is validated by one or more network devices. An originating router detects an offered IP address associated with a calling party node, for example, upon receiving a SIP Invite message initiated by the calling party node. The originating router determines the validity of the offered IP address and hence determines the validity of the Caller ID information based on the validity of the offered IP address. The originating router sends indicia of the validity to a terminating router, connected to a called party node, by inserting a verification bit in the SIP Invite message and sending the transformed SIP Invite message to the terminating router. Alternatively, the terminating router may query the originating router for indicia of validity. Upon receiving the indicia of validity, the terminating router may notify the called party node and so inform the called party whether it can rely on the Caller ID information.

8 Claims, 3 Drawing Sheets

U.S. PATENT DOCUMENTS

| | | |
|---|---|---|
| 2002/0136206 A1* | 9/2002 | Gallant et al. ............... 370/352 |
| 2002/0181670 A1* | 12/2002 | Myers et al. ............... 379/88.13 |
| 2003/0012149 A1* | 1/2003 | Maggenti et al. ............. 370/260 |
| 2003/0063599 A1* | 4/2003 | Aggarwal et al. ............. 370/352 |
| 2004/0022252 A1* | 2/2004 | Jang et al. ............... 370/395.52 |
| 2004/0141599 A1* | 7/2004 | Tang et al. ................ 379/93.24 |
| 2004/0161083 A1* | 8/2004 | Crockett et al. ........... 379/93.23 |
| 2004/0165703 A1* | 8/2004 | Jones ......................... 379/88.13 |
| 2005/0084084 A1* | 4/2005 | Cook et al. .............. 379/142.01 |
| 2005/0175166 A1* | 8/2005 | Welenson et al. ........ 379/265.02 |
| 2005/0203985 A1* | 9/2005 | Faynberg et al. ............. 709/200 |
| 2005/0226252 A1* | 10/2005 | Tomita .................... 370/395.42 |
| 2005/0249225 A1* | 11/2005 | Singhal ......................... 370/401 |
| 2006/0077959 A1* | 4/2006 | Beckemeyer ................ 370/352 |
| 2006/0115074 A1* | 6/2006 | Hollatz et al. .......... 379/265.09 |
| 2007/0189500 A1* | 8/2007 | Stanford ................. 379/355.01 |
| 2007/0268894 A1* | 11/2007 | Fukui ........................... 370/389 |

* cited by examiner

NETWORK SUPPORT FOR CALLER ID VERIFICATION

FIELD OF THE INVENTION

This invention relates generally to the field of telecommunication systems and, more particularly, to a feature for certifying that Caller ID information has not been spoofed for Voice over IP (VoIP) calls.

BACKGROUND OF THE INVENTION

Caller ID is a well-known feature whereby the directory number of a calling party is displayed on a recipient's phone coincident to ringing the called party phone for an incoming call. The recipient may screen the call by viewing the directory number before choosing to answer the call and in such manner, the recipient may avoid certain calls from unrecognized or undesired calling parties. Caller ID information may also be used to automatically block certain calls or to provide different call treatment (e.g., directing the call to a messaging system) without ringing the called party phone. Accordingly, Caller ID is presently an effective tool for screening or blocking calls.

However, various countermeasures have evolved for the purpose of circumventing or reducing the efficacy of Caller ID. One such countermeasure comprises "spoofing" technology that causes the Caller ID feature to display the wrong name and/or number so as to disguise the identity of the true caller. In such manner, for example, a telemarketer or other undesired caller may steal the identity of a different legitimate caller and trick the called party into answering the phone. The spoofing paradigm has emerged as the telecommunications industry begins to shift toward packet-based technologies such as Voice over IP ("VoIP").

Spoofing for the purpose of masking a marketer's identity is illegal under the Telemarketing Sales Rule, enforced by the Federal Trade Commission (FTC). However, loopholes exist in that a business may cause a different number to be displayed for an incoming call so long as the different number is owned by the business. In such manner, for example, a call from a salesperson's personal line may appear as if it originated from the company's main number. Moreover, the laws do not currently prevent the use of spoofing technology by individual citizens and thus there is a great potential for abuse by crank callers, stalkers and the like. Thus, it seems that the use of spoofing technology will continue, and perhaps even increase, in the foreseeable future. For so long as spoofing technology continues to be used, it threatens to undermine the Caller ID feature since the recipient no longer can trust the authenticity of the Caller ID information. Consequently, a need exists to preserve the benefits of Caller ID despite the presence of spoofing technology.

SUMMARY OF THE INVENTION

This need is addressed and a technical advance is achieved in the art by a feature for authenticating (i.e., determining the validity of) Caller ID information, thereby certifying that Caller ID information has not been spoofed for Voice over IP (VoIP) calls. Advantageously, the feature preserves the benefits of the Caller ID feature such that recipients may rely on certified Caller ID information to screen, block or provide different call treatment for incoming calls.

In one embodiment, there is provided a method of determining the validity of Caller ID information provided coincident to a VoIP call, wherein Caller ID information associated with a calling party node is displayed to a called party node. The method comprises a network device (e.g., originating router) detecting an offered IP address associated with the calling party node, wherein the Caller ID information is based on the offered IP address. For example, the offered address may be detected from a SIP Invite message initiated by the calling party node. The originating router determines the validity of the offered IP address and hence determines the validity of the Caller ID information based on the validity of the offered IP address. The originating router thereafter may send indicia of the validity to a network device (e.g., terminating router) logically connected to the called party node. Optionally, the originating router sends indicia of validity by inserting a verification bit in the SIP Invite message, yielding a transformed SIP Invite message; and sending the transformed SIP Invite message to the terminating router.

In one embodiment, there is provided a method of verifying Caller ID information provided coincident to a VoIP call, wherein a terminating router logically connected to the called party node receives an IP address associated with the calling party node and sends Caller ID information to the called party node based on the IP address. The method comprises a network device (e.g., terminating router) receiving indicia of validity of the Caller ID information from an originating router and sending indicia of the validity to the called party node. Optionally, the terminating router may receive the indicia of validity responsive to querying the originating router or responsive to receiving a SIP Invite message including a verification bit from the originating router.

In another embodiment, there is provided a network device (e.g., originating or terminating router) residing in a communication system supporting a VoIP call, wherein Caller ID information associated with a calling party node is displayed to a called party node. The network device comprises means for receiving a SIP Invite message including an offered IP address associated with the calling party node; means for determining the validity of the offered IP address; and means for determining the validity of the Caller ID information based on the validity of the offered IP address, the Caller ID information being valid if the offered IP address is valid and the Caller ID information being invalid if the offered IP address is invalid.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
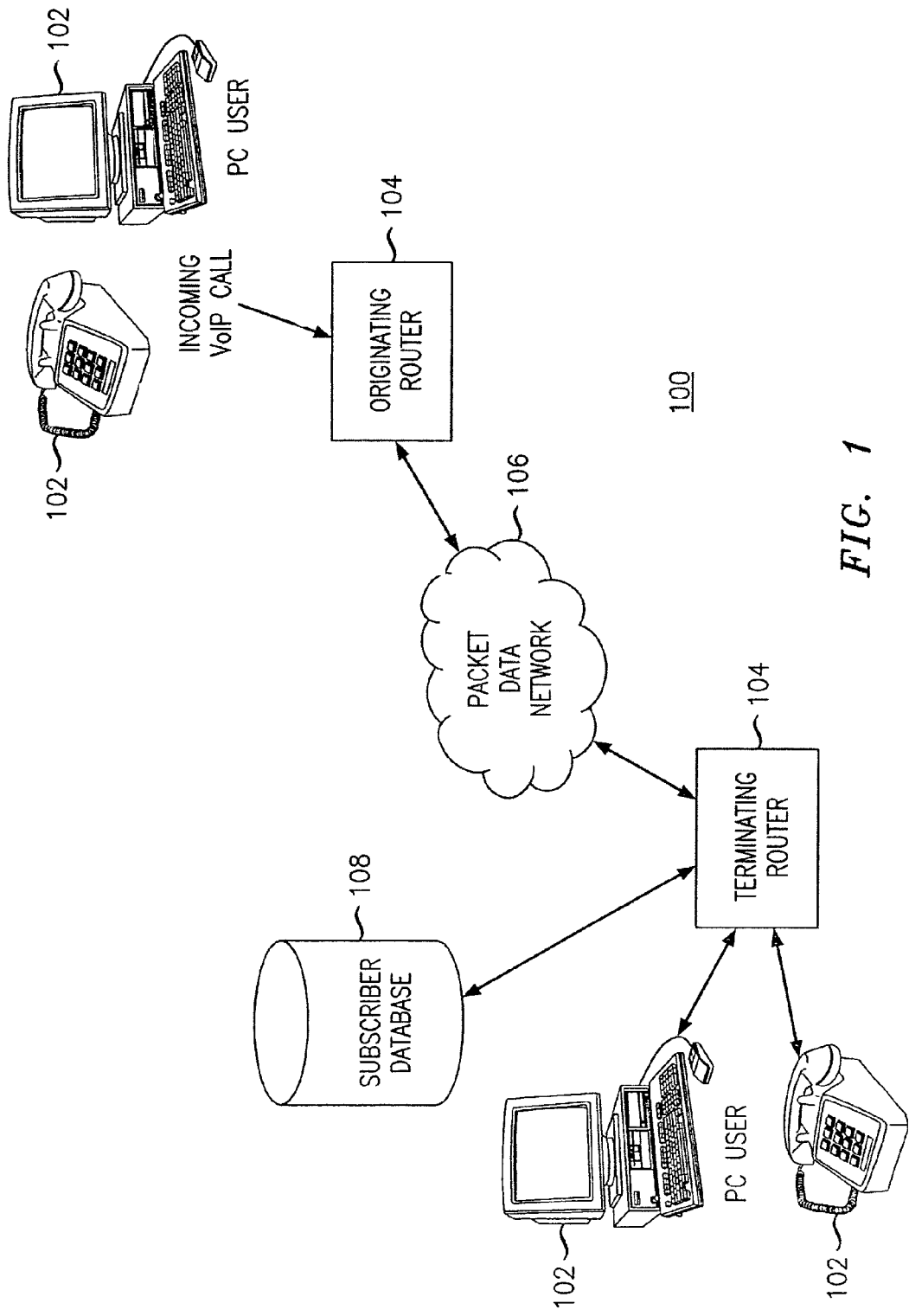
FIG. 1 is a block diagram of a communication system in which embodiments of the present invention may be implemented.

FIG. 1 shows by way of example and not limitation, a communication system 100 comprising a plurality of user nodes 102 connected via one or more routers 104 to a packet network 106. In one embodiment, the user nodes 102 comprise IP host devices including, without limitation, personal computers, IP phones or the like having the capacity to send and receive IP packets with other host devices coincident to Voice over IP (VoIP) telephony service. The user nodes 102 are logically coupled to one or more routers 104, which in turn, are logically connected via the packet network 106 (e.g., an IP network). The routers 104 comprise network devices having a processor and memory (not shown) and configured to receive and transport IP packets between and among other router(s) or hosts in the communication system 100. Optionally, the routers 104 may comprise gateway routers, for example, for interconnecting networks such as the PSTN or wireless networks (not shown) to the communication system 100.

Generally, any of the user nodes 102 may initiate or receive a VoIP call. In one embodiment, VoIP calls are initiated using Session Initiation Protocol (SIP). According to the SIP protocol, an originating node initiates a call by sending a SIP Invite message to its associated router ("originating router"). Responsive to the SIP Invite message, the originating router 104 identifies the called party node and sets up a communication session to the called party node via its associated router ("terminating router"). As is well known by those skilled in the art, the originating and terminating routers always know the actual IP address of the calling party node and called party node, respectively, and send information to the respective nodes via their IP addresses for the duration of the communication session. The IP addresses may be static or dynamically assigned for each session.

Typically, the SIP Invite message includes indicia of an IP address ("offered IP address") of the calling party. The offered address may or may not correspond to the actual IP address. For example, the offered address may differ from the actual IP address if the originating node is attempting to spoof Caller ID. As an example, in the case where the called party has Caller ID service and the displayed Caller ID information is based on the IP address in the SIP Invite message, the originating node may attempt to spoof Caller ID by supplying an incorrect IP address in the SIP Invite message so as to cause an incorrect directory number to be displayed as the Caller ID. According to embodiments of the present invention, such as will be described in greater detail in relation to FIG. 2 and FIG. 3, the originating router is able to detect whether or not the offered address is valid and hence determine whether the Caller ID information is valid. The originating router sends verification information as appropriate to the terminating router and the terminating router may inform the called party whether or not Caller ID information is valid. In such manner, a called party having the Caller ID feature can determine whether or not the displayed Caller ID information can be relied upon.

In one embodiment, the verification information is offered to subscribers of a Caller ID verification feature. As shown in FIG. 1, the terminating router is logically connected to a subscriber database 108. The subscriber database 108 may include a list of called party nodes that subscribe to the Caller ID verification feature. As will be appreciated, the subscriber database 108 may also include various other information such as a list of IP addresses corresponding to various directory numbers, a list of called party nodes that subscribe to the Caller ID feature, and the like.

Figure 2:
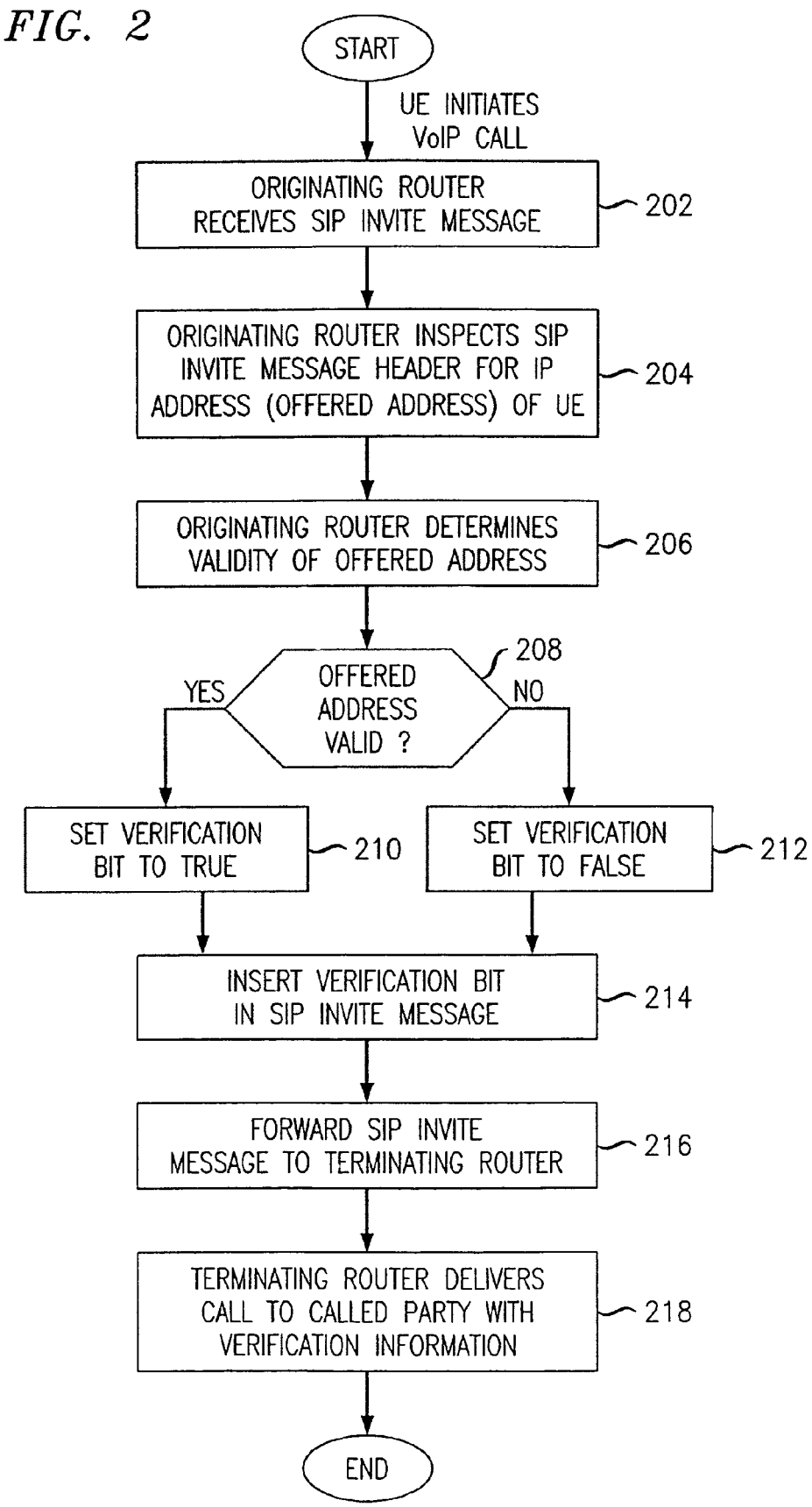
FIG. 2 is a flowchart showing steps performed by an originating router to authenticate Caller ID information according to an embodiment of the present invention.

Turning now to FIG. 2, there is shown a flowchart of a method that may be implemented in the communication system of the type shown in FIG. 1, for an originating router to determine the authenticity of Caller ID information offered in a SIP Invite message. The steps of FIG. 2 are implemented, where applicable, using stored software routines within an originating router 104.

The method presumes a calling party node sends a SIP Invite message, as is known in the art, to initiate a VoIP call to a called party node. The SIP Invite message includes a message header with indicia of an IP address ("offered address") of the calling party node, which may or may not correspond to the actual IP address of the calling party node. At step 202, the originating router (i.e., serving the calling party node) receives the SIP Invite message. At step 204, the originating router inspects the SIP Invite message header to detect the offered address of the calling party node. The originating router also determines the actual IP address of the calling party node and uses the actual IP address to set up a VoIP session with the called party node.

At step 206, the originating router determines the validity of the offered address. In one embodiment, this is accomplished by comparing the actual IP address to the offered IP address. If the offered IP address is the same as the actual IP address, the offered address is valid. However, if the offered IP address differs from the actual IP address, the offered address is not valid. Based on the validity of the offered address, a decision is made at step 208 whether to proceed to step 210 or step 212.

If the offered address is valid, the originating router sets a verification bit to TRUE at step 210. Otherwise, if the offered address is not valid, the originating router sets a verification bit to FALSE at step 212. The originating router inserts the verification bit (e.g., TRUE or FALSE) in the SIP Invite message at step 214, thereby forming a modified SIP Invite message. The originating router sends the modified SIP Invite message to the terminating router at step 216.

Typically, in the case where the called party has Caller ID service, the terminating router sends Caller ID information to the called party based on the IP address in the SIP Invite message (i.e., the offered address). Depending on the status of the verification bit, the terminating router can determine whether the Caller ID information provided to the called party is valid. That is, the terminating router knows that the Caller ID information is valid if the verification bit is TRUE or not valid if the verification bit is FALSE.

In one embodiment, once the terminating router determines the validity of the Caller ID information, it informs the called party node accordingly. In such manner, the called party node knows whether or not it can rely on the Caller ID information to screen, block or provide different call treatment for the incoming call. Optionally, the terminating router may require that the called party node is a subscriber to a Caller ID verification service before providing verification information. That is, the terminating router may decline sending the Caller ID verification information if the called party node is not a subscriber to a Caller ID verification service.

As will be appreciated, a variety of displays, tones, announcements or the like may be used to inform the called party node whether the Caller ID information is valid. In one embodiment, to protect the privacy of the calling party node, the called party node is informed whether the Caller ID information is valid but is not informed of the actual number or identity of the calling party node. Alternatively, if privacy is not a concern, the called party node could be informed of the actual number or identity of the calling party node.

Figure 3:
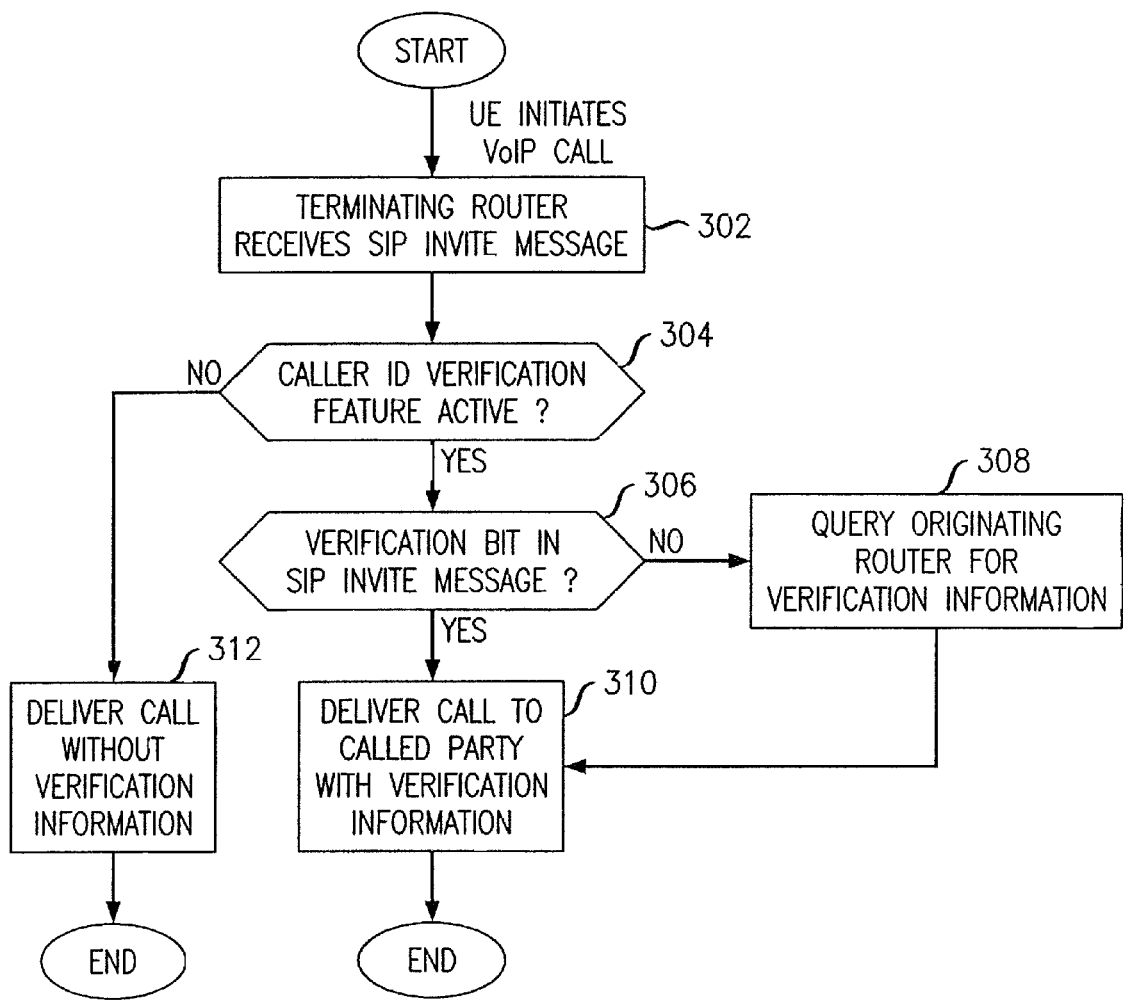
FIG. 3 is a flowchart showing steps performed by a terminating router to authenticate Caller ID information according to an embodiment of the present invention.

Now turning to FIG. 3, there is shown a flowchart of a method that may be implemented in the communication system of the type shown in FIG. 1, for a terminating router to determine the authenticity of Caller ID information. The steps of FIG. 3 are implemented, where applicable, using stored software routines within a terminating router 104.

The method presumes a calling party node sends a SIP Invite message, as is known in the art, to initiate a VoIP call to a called party node. The SIP Invite message includes a message header with indicia of an IP address ("offered address") of the calling party node, which may or may not correspond to the actual IP address of the calling party node. In one embodiment, the SIP Invite message is received by an originating router which, as described in relation to FIG. 2, determines the validity of the offered address and inserts a verification bit in the SIP Invite message thereby forming a modified SIP Invite message, and the originating router sends the modified SIP Invite message to the terminating router. Alternatively, the SIP Invite message is received by the originating router and forwarded "as is" to the terminating router without inserting a verification bit.

At step 302, the terminating router (i.e., serving the called party node) receives the SIP Invite message. Depending on the embodiment, the SIP Invite message may comprise a modified SIP Invite message (i.e., with verification bit) or may comprise the SIP Invite message without a verification bit.

At step 304, the terminating router checks whether the called party node is a subscriber to a Caller ID verification service. In one embodiment, this comprises checking a database (e.g., database 108) to see whether the called party directory number or IP address corresponds to a valid account. As will be appreciated, the validity status of the account may require the subscriber maintaining a particular balance (i.e., in a prepaid service implementation) or having a paid-up balance (i.e., in a post-paid service implementation). For example, an account may be disabled if the subscriber account balance is insufficient or is not paid-up within a designated time. Optionally, the terminating router may not require that the called party node is a subscriber to a Caller ID verification service.

In one embodiment, if the called party node is not a validated subscriber of the Caller ID verification service, the terminating router at step 312 causes the call to be delivered without verification information.

If the called party node is a validated subscriber of the Caller ID verification service (or if Caller ID verification subscription is not required), the terminating router at step 306 checks for the presence of a verification bit in the SIP Invite message. If a verification bit is present, the Caller ID information has already been determined by the originating router to be valid (if the verification bit is TRUE) or not valid (if the verification bit is FALSE). If a verification bit is not present, the originating router has not yet determined the validity of the Caller ID information and the terminating router queries the originating router for verification information at step 308. Responsive to the query, the originating router determines the validity of the offered address and so informs the terminating router. The terminating router at step 310 causes the call to be delivered with appropriate verification information to the called party node.

As described in relation to FIG. 2, a variety of displays, tones, announcements or the like may be used to inform the called party node whether the Caller ID information is valid. In one embodiment, to protect the privacy of the calling party node, the called party node is informed whether the Caller ID information is valid but is not informed of the actual number or identity of the calling party node. Alternatively, if privacy is not a concern, the called party node could be informed of the actual number or identity of the calling party node.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system supporting a Voice over IP (VoIP) call, wherein a calling party node initiates the VoIP call by sending a Session Initiation Protocol SIP message to a network device the SIP message including an offered IP address associated with the calling party node, and wherein Caller ID information associated with the calling party node and based on the offered IP address is displayed to a called party node, a method of determining the validity of the Caller ID information, the method comprising the network device:
   detecting the offered IP address;
   comparing the offered IP address to an actual IP address associated with the calling party node to determine the validity of the offered IP address; and
   determining the validity of the Caller ID information based on the validity of the offered IP address, the Caller ID information being valid if the offered IP address is the same as the actual IP address and the Caller ID information being invalid if the offered IP address differs from the actual IP address.

2. The method of claim 1, wherein the network device comprises a router logically connected to the calling party node, defining an originating router.

3. The method of claim 1, wherein the SIP message initiated by the calling party node comprises a SIP Invite message, the step of detecting the offered IP address comprising detecting the offered IP address residing in a header of the SIP Invite message.

4. The method of claim 3, further comprising the originating router sending indicia of the validity of the Caller ID information to a terminating router, the terminating router defining a network device logically connected to the called party node.

5. The method of claim 4, wherein the step of sending indicia of the validity of the Caller ID information comprises:
   inserting a verification bit in the SIP Invite message, yielding a transformed SIP Invite message, the verification bit comprising indicia of the validity of the Caller ID information; and
   sending the transformed SIP Invite message to the terminating router.

6. The method of claim 4, further comprising the terminating router sending indicia of the validity of the Caller ID information to the called party node.

7. The method of claim 4, further comprising the terminating router:
   consulting a database to determine if a Caller ID verification feature is active for the called party node;
   if the Caller ID verification feature is active, sending indicia of the validity of the Caller ID information to the called party node; otherwise if the Caller ID verification feature is not active, declining sending indicia of the validity of the Caller ID information to the called party node.

8. In a communication system supporting a Voice over IP (VoIP) call, wherein a calling party node initiates the VoIP call by sending a Session Initiation Protocol (SIP) message to a network device, the SIP message including an offered IP address associated with the calling party node, and wherein Caller ID information associated with a the calling party node and based on the offered IP address is displayed to a called party node, a network device comprising:
   means for receiving a the SIP message and detecting the offered IP address;

means for comparing the offered IP address to an actual IP address associated with the calling party node to determine the validity of the offered IP address; and means for determining the validity of the Caller ID information based on the validity of the offered IP address, the Caller ID information being valid if the offered IP address is the same as the actual IP address and the Caller ID information being invalid if the offered IP address differs from the actual IP address.

* * * * *